2,300,619

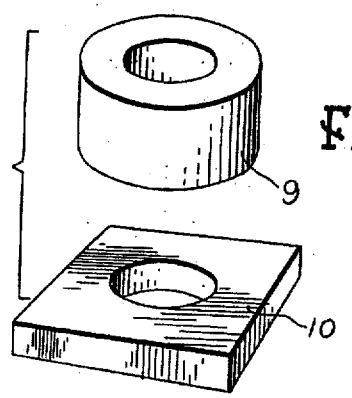
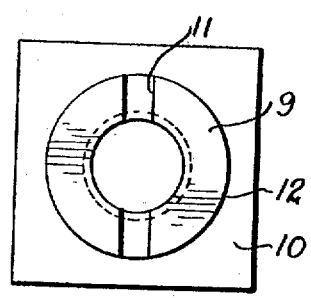
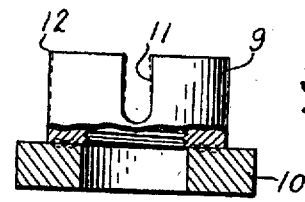
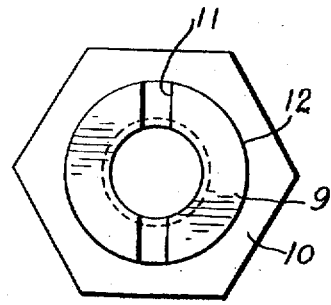
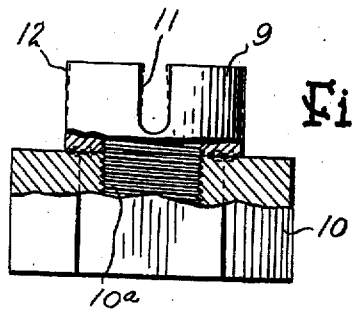
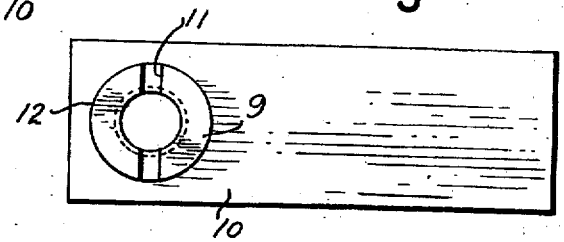
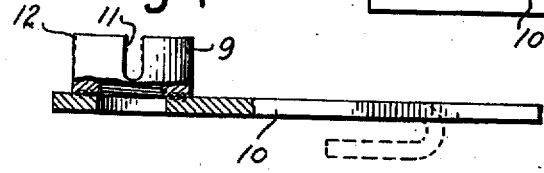
INVENTOR.
Plummer E. Double
BY Edward M. Apple
Attorney Patented Nov. 3, 1942

UNITED STATES PATENT OFFICE 2,300,619

LOCK NUT AND METHOD OF MAKING

Plummer E. Double, Detroit, Mich.

Application December 20, 1941, Serial No. 423,715

4 Claims. (Cl. 10—86)

This invention relates broadly to fastening devices and has particular reference to a lock nut and the method of making it.

In the aviation industry there is a great demand for fastening devices, which are light in weight, yet durable, and which can be easily installed, and when once in position will not become loosened by excessive vibration.

It is to such a device that this disclosure is directed.

The invention resides in the novel construction of the device and in the method of producing the same, as hereinafter described and illustrated in the accompanying drawing wherein:

Fig. 1 is a perspective view of the two elements which go to make up my improved device.

Fig. 2 is a plan view of a completed nut embodying my invention.

Fig. 3 is a side view, partly in section, of the device illustrated in Fig. 2.

Fig. 4 is a plan view of a modified form of nut.

Fig. 5 is a side view, partly in section, of the nut illustrated in Fig. 4.

Fig. 6 is a plan view of another modification of the device.

Fig. 7 is a side elevation, partly in section, of the device illustrated in Fig. 6.

Referring now more particularly to the drawing it will be understood that in the embodiment herein disclosed my improved device consists principally, of a collar 9, and an apertured base or flange member 10, which are secured together by welding. Although I do not propose to be limited in practice to any particular type of welding, I prefer to use a "cold" welding process, in which the heat is confined to a definite area so that the parts are not discolored and the metal is not distorted, as is often the practice in ordinary welding operations.

In order to conserve metal I prefer to make the collars 9 from specially drawn or extruded stock, and the bases 10 from special bar stock, so that a very minimum of work is required. A further advantage of this method is that materials of different kinds can be employed in making the collars 9, and the bases 10, as the functions of the two parts are different. For example, in order to get the maximum locking efficiency from the nut, the collar 9 should be made of a spring metal, whereas the primary function of the base 10 is simply to hold the nut in position, so that a less expensive metal can be employed with equal results.

The collar 9 can be threaded before or after being welded to the base 10, although I prefer to weld the parts together before tapping, so that the base 10 may be initially utilized to hold the device against turning while in the tapping machine. The base 10 may or may not be threaded depending upon the use to which it is to be applied. In Figs. 4 and 5, the base 10 is threaded whereas in the other views only the collar 9 is provided with threads.

After the parts 9 and 10 are welded together as hereinabove described, the collar 9 is slotted as at 11, and the upper ends 12 of the collar are inwardly displaced as shown by the dotted lines, to provide a gripping or locking action when a bolt is inserted. A locking action may also be effected by distorting the thread area by other means.

In Figs. 4 and 5, I illustrate a modified form in which the base 10 is hexagonal in shape and much thicker than is normally required. In this embodiment the base 10 is provided with threads as at 10a.

In Figs. 6 and 7, I illustrate another modified form in which the base 10 is in the form of a clip for attaching to another element.

Although I have illustrated and described herein certain embodiments of my invention, it will be understood that certain other modifications can be made all of which are intended to be within the scope of the appended claims.

Having described my invention what I claim and desire to protect by Letters Patent is:

1. The method of forming a lock nut, which consists of cutting a length of preformed hollow stock, cutting a length of flat bar stock, aperturing the bar stock with a diameter corresponding to the diameter of the hollow stock, welding the two together, tapping the hollow stock and then distorting the thread area of the hollow stock.

2. The method defined in claim 1, in which the hollow stock is slotted before the thread area is distorted.

3. The method of forming a lock nut which consists of providing two lengths of apertured metal having different characteristics of configuration, welding the two lengths of metal together, tapping the aperture of at least one of said lengths, slotting the tapped length and then distorting part of the thread area of said tapped length.

4. The method of forming a lock nut which consists of providing two lengths of apertured metal having different characteristics of configuration and composition, welding the two lengths of metal together, so their apertures are in alignment, tapping the aperture of at least one of said lengths, slotting the tapped length and then distorting part of the thread area of said tapped length.

PLUMMER E. DOUBLE.